United States Patent [19]

Ohta et al.

[11] Patent Number: 5,109,368
[45] Date of Patent: Apr. 28, 1992

[54] OPTICAL DEVICE USING A RESILIENT MEMBER

[75] Inventors: Hiroaki Ohta, Hiratuska; Akio Yabe, Yokohama; Akira Saito, Odawara, all of Japan

[73] Assignees: Hitachi, Ltd., Tokyo; Hitachi Video Engineering, Incorporated, Yokohama, both of Japan

[21] Appl. No.: 579,975

[22] Filed: Sep. 10, 1990

[30] Foreign Application Priority Data

Sep. 12, 1989 [JP] Japan .................. 1-234691

[51] Int. Cl.⁵ ............................................. G11B 7/00
[52] U.S. Cl. ........................ 369/44.14; 369/44.15; 369/44.16; 369/44.22
[58] Field of Search ............... 369/44.11, 44.15, 44.16, 369/44.22, 44.14, 44.19

[56] References Cited

U.S. PATENT DOCUMENTS

| | | | |
|---|---|---|---|
| 4,032,776 | 6/1977 | Van Rosmalen | 369/44.15 |
| 4,252,412 | 2/1981 | Camenk | 369/44.15 |
| 4,422,169 | 12/1983 | Vitale et al. | 369/44.22 |
| 4,507,765 | 3/1985 | Suzuki et al. | 369/44.22 |
| 4,773,055 | 9/1988 | Gyzen et al. | 369/44.16 |
| 4,782,476 | 11/1988 | Sekimoto et al. | 369/44.15 |

FOREIGN PATENT DOCUMENTS

| | | | |
|---|---|---|---|
| 58-57641 | 4/1983 | Japan | 369/44.15 |
| 59-112447 | 6/1984 | Japan . | |
| 62-46442 | 2/1987 | Japan | 369/44.15 |
| 62-146438 | 6/1987 | Japan | 369/44.15 |

Primary Examiner—Roy N. Envall, Jr.
Assistant Examiner—Nabil Hindi
Attorney, Agent, or Firm—Fay, Sharpe, Beall, Fagan, Minnich & McKee

[57] ABSTRACT

An optical pickup device having a dust blocking function according to the present invention includes a casing having an opening therein, an optical system disposed within an interior of the casing and having photoelectric elements optically coupled with each other, an objective lens disposed inside the opening as spaced from an edge of the opening to be optically coupled with the optical system, driving device for moving the objective lens to a desired position, and a resilient member for sealing a gap between the edge of the opening and the object lens, whereby the resilient member enables movement of the object lens while preventing any intrusion of dust into an interior of the pickup device having the optical system incorporated therein.

31 Claims, 4 Drawing Sheets

OPTICAL DEVICE USING A RESILIENT MEMBER

BACKGROUND OF THE INVENTION

The present invention generally relates to a dust proof device in an optical pickup device of an optical data recording/reproducing apparatus such as an optical disk recording/reproducing apparatus and, more particularly, to a dust-tight device in an optical pickup device which prevents intrusion of external dust.

A prior art dust-proof device for an optical pickup device has been disclosed, for example, in Japanese patent un-examined publication No. JP-A-59-112447 filed on Dec. 18, 1982 by AKAI DENKI K.K. in Japan, wherein, for the purpose of preventing dust from invading through a gap between the inner periphery of a light-beam passage aperture and the outer periphery of an objective lens into the interior of the optical pickup device, a dust passage route is made long with a complicated structure to give the dust a long detour and minimize the possibility of the dust invasion.

The structure of the optical pickup device will be explained by referring to FIG. 1. The illustrated optical pickup device includes an optical system and a driving mechanism. The optical system includes an objective lens 1, photoelectric elements such as a light-emitting element 15 (e.g., a semiconductor laser element) and a light-receiving element 16 (e.g., a photodiode), a beam splitter 17, and a tracking mirror 14. The driving mechanism includes a coil 3, permanent magnets 5a and 5b and yokes 4a and 4b to drive the objective lens 1. More specifically, the driving mechanism is provided to move the objective lens 1 in its optical axis direction and focus light on a recording surface of an optical disk 13 by utilizing an electromagnetic force generated based on the mutual action between a coil placed in the magnetic field of the permanent magnets and a current flowing through the coil.

The optical pickup device also includes a casing 20 and a cover 11 which enclose the aforementioned optical system and driving mechanism. More in detail, the cover 11 is provided therein with an opening 10 so that a gap is defined between the opening 10 and the objective lens 1 to allow the movement of the objective lens along the opening 10 therein. The objective lens 1 is mounted to the casing 20 by means of thin plate-shaped springs 2a and 2b fixedly mounted on the top and bottom of the objective lens, so that the objective lens can be freely moved vertically (that is, in the optical axis direction) under the influence of the resilient force of the springs with substantially no friction.

The prior art optical pickup device has had such a defect that dust intrudes into the interior of the optical pickup device through a gap between the objective lens 1 and opening 10 during operation of the device and finally adversely affects the mirror 14, photoelectric elements and so on in the optical system incorporated therein, resulting in reduction of its recording and reproducing performances.

With the aforementioned optical pickup device of the aforementioned Japanese Patent Appln. Publication invention, the pickup device has such a structure as to hardly permit the invasion of external dust into the interior of the pickup. However, since there still exists a passage permitting the invasion of external dust into the pickup interior, it cannot be avoided that the external dust enters into the pickup interior from a gap between the inner periphery of an aperture for passage of a light beam and the outer periphery of the objective lens via a curved path.

When a moving part is provided with a cylindrical member for the purpose of making complicated the path for dust to be guided to the interior as in the prior art pickup device, further, this undesirably involves the deterioration of the frequency characteristic of the object lens driver and the reducing of a high-order resonance frequency.

In this way, the prior art optical pickup device has had such a problem that, though the device can avoid the intrusion of relatively large-sized dust particles with a certain level of dust blocking effect, the device cannot virtually avoid the intrusion of relatively small-sized dust particles, and the small dust particles reach the interior of the pickup, which disadvantageously results in that the object lens driver is deteriorated in its frequency characteristic and the high-order resonance frequency is lowered.

SUMMARY OF THE INVENTION

It is an object of the present invention to provide a dust-proof device for an optical pickup device which overcomes the above problem in the prior art and can completely shield the optical pickup device from a dust intrusion path while minimizing the influence of the shield on frequency characteristic of an objective lens driving mechanism.

In accordance with the present invention, the above object is attained by providing a dust-proof device for an optical pickup device wherein, basically, a space (gap) between a light-beam passage aperture located at the bottom or top of an object-lens driving mechanism and an objective lens is completely tightly sealed to thereby isolate the interior of the optical pickup device from its outside space.

More in detail, the optical pickup device having a dust blocking function according to the present invention includes a casing having therein an upper light-beam passage aperture associated with an external device (optical disk) and a lower light-beam passage aperture leading to the interior of the optical pickup device, an objective lens disposed between these light-beam passage apertures, and an object-lens driving mechanism for driving the objective lens at least in its optical axis direction. The optical pickup device is featured in that a soft, resilient dust blocking member is provided to be tightly fixed at its one end to the lower outer periphery of the objective lens or in the vicinity thereof and at the other end to the periphery edge of the lower light-beam passage aperture or in the vicinity thereof. The dust blocking member may be made in the form of, for example, a pipe-shaped bellows flexible in its vertical and horizontal directions.

Alternatively, the dust blocking member may be tightly fixed at its one end to the upper outer periphery of the objective lens or in the vicinity thereof and at the other end to the peripheral edge of the upper light-beam passage aperture or in the vicinity thereof (for example, to a cover member disposed in the upper part of the object-lens driving mechanism, a spring member or a status member for the object-lens driving mechanism). In this case, the dust blocking member is made in the shape of a flat plate rather than a pipe.

The object-lens driving mechanism may employ the type that drives the objective lens in its optical axis direction or the type of driving the objective lens both in the optical axis direction and in a direction perpendicular thereto to allow the dust blocking member to be similarly provided according to the present invention.

The dust blocking member to be used in the present invention is made preferably of a very soft rubber material having a very thin bellows part to avoid any influence of the provision of the dust blocking member on the frequency characteristic of the object-lens driving mechanism and to minimize the influence of the member provision on the mechanical characteristics of the mechanism.

The dust blocking member is supported at its one end to a mounting part directly or indirectly through such a suitable member as a fitting member or a reinforcing member.

Explanation will next be made as to the operation of the aforementioned arrangement of the invention in comparison with that of the prior art.

Dust particles tend to enter the interior of the object-lens driving mechanism through a gap between the outer cylindrical periphery of the objective lens and the inner periphery of the light-beam passage aperture located in the upper part of the object-lens driving mechanism and gradually drop downwardly and reach the bottom of the object-lens driving mechanism.

Under such a condition, in the prior art optical pickup device, dust particles arriving at the bottom of the object-lens driving mechanism are passed through the light-beam passage aperture located at the bottom of the object-lens driving mechanism, guided into the interior of the optical pickup device, and attached onto a tracking mirror and so on provided therein, which results in that the performances of the optical pickup device are reduced.

In the present invention, on the other hand, since the dust blocking member is tightly fixedly mounted between the upper or lower outer cylindrical periphery of the objective lens and the peripheral edge of the upper or lower light-beam passage aperture located in the upper or lower part of the object-lens driving mechanism, the space between the bottom of the objective lens and the lower light-beam passage aperture provided in the lower (bottom or base) part of the object-lens driving mechanism as well as the interior space of the optical pickup device incorporating the tracking mirror and so on located deeper than the lower light-beam passage aperture can be completely isolated by means of the dust blocking member from another space (ambient space outside the optical pickup device). As a result, even when dust enters the interior of the object-lens driving mechanism and reaches the outer peripheral surface of the dust blocking member, the dust is not further guided to the lower surface of the objective lens and attached thereto or further passed through the lower light-beam passage aperture to reach the interior of the optical pickup device.

In addition, since the dust blocking member is made in the form of a very soft-material bellows pipe having a very thin wall, and is flexible freely in vertical and horizontal directions, the provision of the dust blocking member will not have any adverse effect on the frequency characteristic (in particular, high-order resonance frequency) of the object-lens driving mechanism.

DESCRIPTION OF THE PREFERRED EMBODIMENTS

The structures and operation of optical pickup devices in accordance with embodiments of the present invention will be explained by referring to FIGS. 2 to 8.

Figure 1:
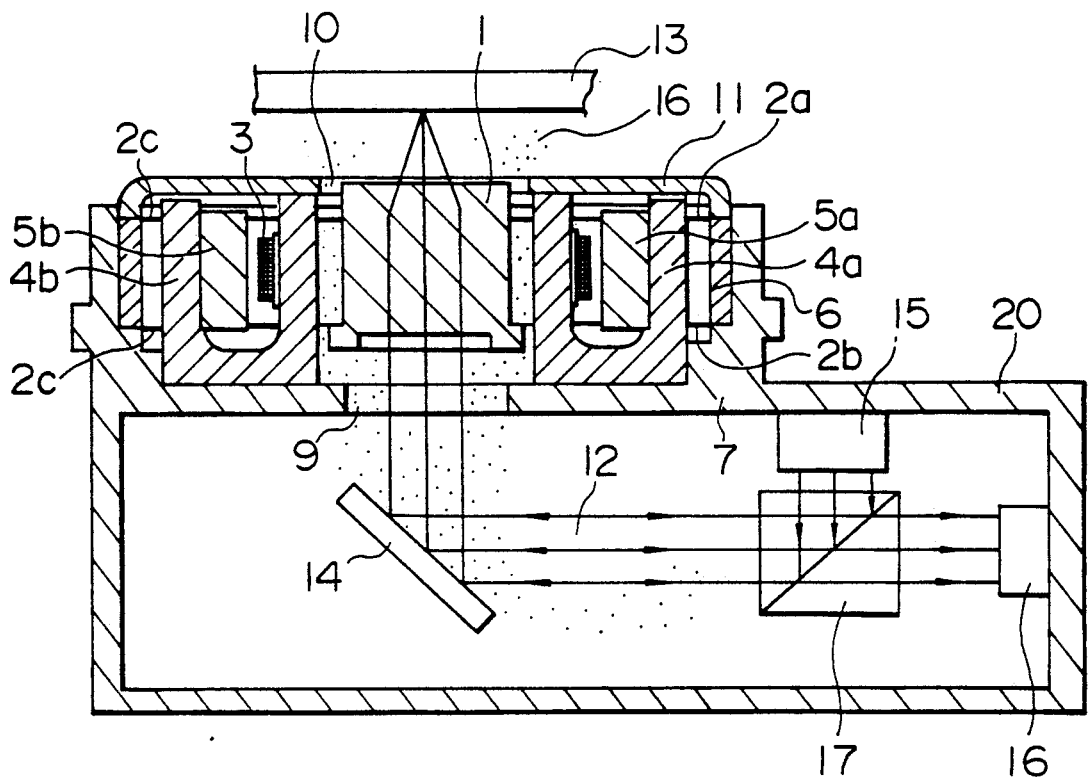
FIG. 1 is a cross-sectional view showing a structure of an optical pickup device to which the present invention is applied.
Figure 2:
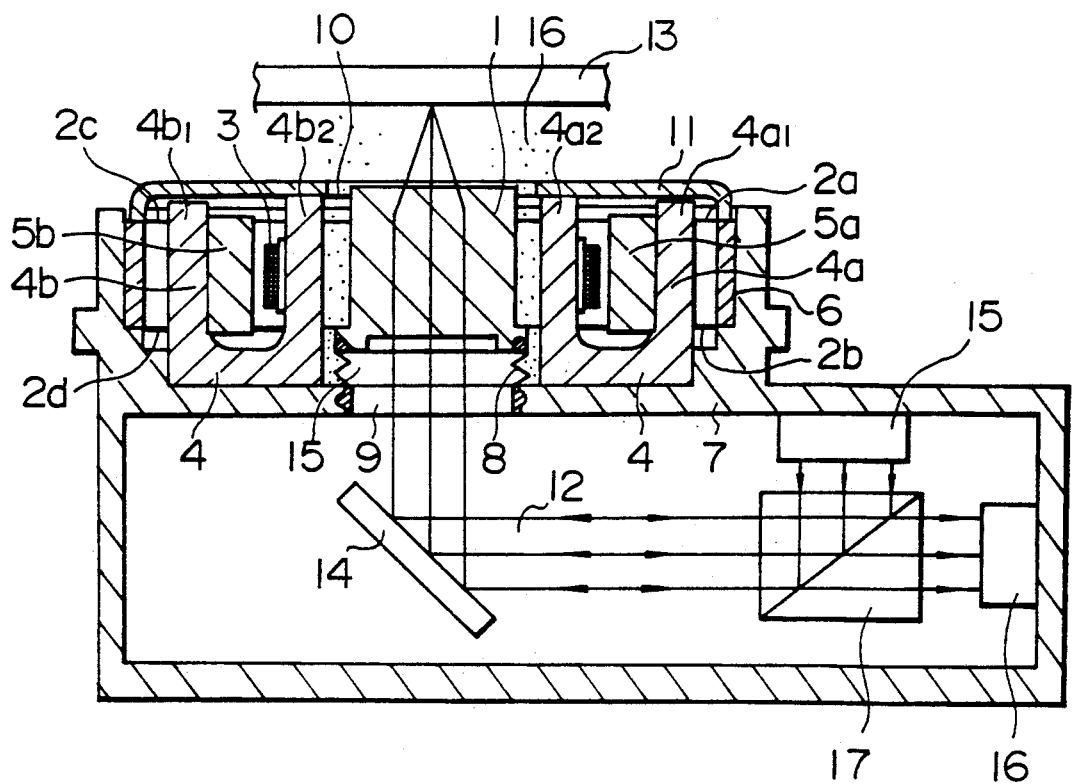
FIG. 2 is a cross-sectional view of an embodiment of the optical pickup device of the present invention.
Figure 3:
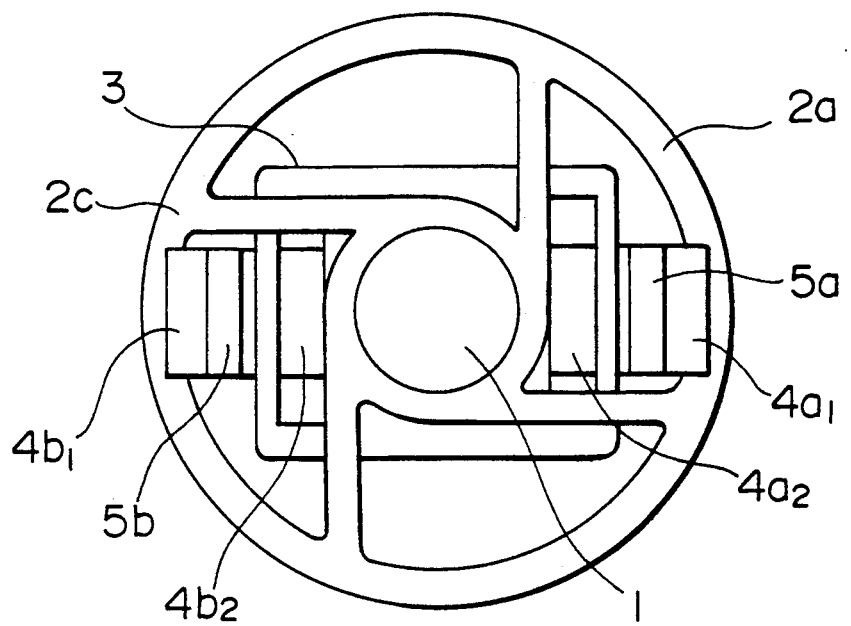
FIG. 3 is a plan view showing a structure of mounting an objective lens used in the embodiment of FIG. 1.

Referring first to FIG. 2, there is shown, in cross section, a first embodiment of the optical pickup device of the present invention, wherein the same parts as those in FIG. 1 are denoted by the same reference numbers. An objective lens 1 is mounted to a casing 20 by means of two plate-shaped springs $2a$-$2c$ and $2b$-$2d$ fixedly mounted on the top and bottom of the objective lens. FIG. 3 shows a mounted relationship between the objective lens 1 and springs $2a$-$2c$ as viewed in the direction of the optic axis of the objective lens in FIG. 2. The springs $2b$-$2d$ are similarly mounted on the objective lens. However, the shape of the springs $2a$-$2c$ and $2b$-$2d$ are not limited to the illustrated one but another suitable shape may be employed as necessary.

Figure 4:
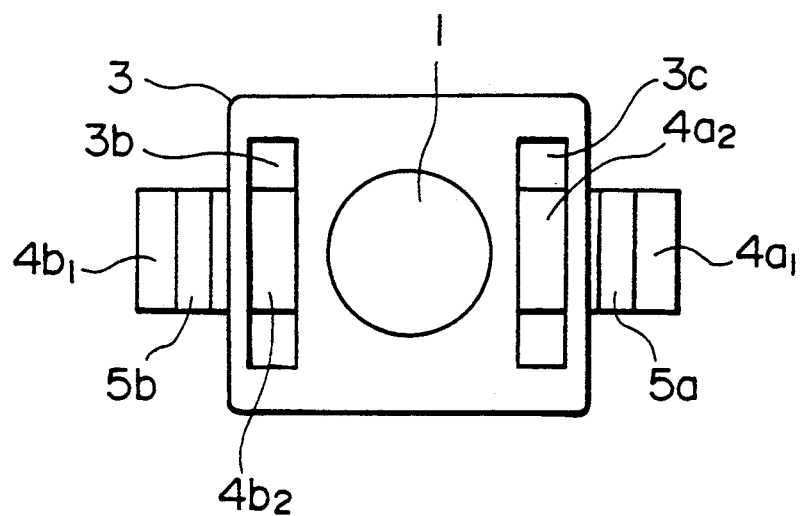
FIG. 4 is a plan view showing a structure of mounting a driving mechanism used in the embodiment of FIG. 1.

Wound around the objective lens 1 is a driving coil 3 for driving the objective lens vertically (in its optical axis direction) through a bobbin. Shown in FIG. 4 is a structure of a driving mechanism including the driving coil 3, magnets 5 and yokes 4 with respect to the objective lens 1. FIG. 4 corresponds to FIG. 3 with the springs $2a$-$2c$ being removed.

The pair of right and left magnets 5 ($5a$, $5b$) and the pair of right and left yokes 4 ($4a$, $4b$) are constituted of a pair of magnetic circuits to magnetize the magnets in such a manner that magnetic flux flows in the horizontal direction across a magnetic gap defined therebetween. The magnetic circuits are provided within a base 7 so that the vertically driving coil 3 is positioned in the magnetic gap. In the present embodiment, outer and inner leg parts $4_{a1}$, $4_{b1}$ and $4_{a2}$, $4_{b2}$ of the yokes $4a$ and $4b$ have respectively such a substantially-rectangular, elongated shape as viewed from the top as shown in FIG. 4. The bobbin has an elongated rectangular shape as viewed from the top, and is wound on its outer periphery with the coil 3. The bobbin is formed in its center with a circular opening in which the objective lens 1 is mounted, and in its right and left side with rectangular openings $3a$ and $3b$ through which the inner leg part $4_{a2}$ of the yoke $4a$ and the inner leg part $4_{b2}$ of the yoke $4b$ are passed. The two springs fixedly supporting the objective lens 1 at its top and bottom are fixed to the base 7 through a spacer 6 in order to maintain a gap between the springs. In the illustrated embodiment, there is not provided a mechanism that moves the objective lens 1 in the horizontal direction (in the tracking direction) with respect to the base 7.

A cover 11 is fixedly mounted on an upper one (2a–2c) of the two springs 2 to prevent invasion of dust from the top of the object-lens driving mechanism. The cover 11 is provided substantially in its center with an aperture 10 through which a light beam 12 is irradiated on an optical disk 13. The base 7 is provided substantially in its center with an aperture 9 through which the light beam 12 reflected at a tracking mirror 14 disposed within the optical pickup is passed and then directed to the objective lens 1.

Figure 6A:
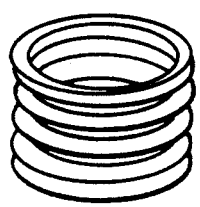
FIGS. 6A and 6B are perspective views of different examples of a resilient dust blocking member.

The present embodiment is further featured in that a dust blocking pipe 8 as shown by its perspective view in FIG. 6A is supported at its one end with a lower outer periphery wall of the objective lens 1 or an object-lens mirror cylinder as tightly contacted therewith through an O-ring, while the dust blocking pipe 8 is fixedly supported at the other end on the inner periphery wall of the light-beam passage aperture 9 provided in the base 7. A space 15 defined by the lower surface of the objective lens 1 and by the inner wall of the dust blocking pipe 8 is coupled to the interior space of the optical pickup device but the interior of the objective-lens driving mechanism is shut off from the outside space surrounding the optical pickup device by means of the dust blocking pipe 8. The dust blocking pipe 8 is made of such highly soft material as soft rubber and has a very thin bellows wall part in its middle part. In addition, the pipe 8 can be resiliently flexed freely vertically and horizontally.

Explanation will next be made as to the operation of the above optical pickup device. A drive current flowing through the vertically driving coil 3 wound around the objective lens 1 through the bobbin acts with magnetic flux flowing through the magnetic gap defined by the magnets 5 and yokes 4 in the magnetic circuits to thereby generate an electromagnetic force. Under the influence of the generated electromagnetic force, the objective lens 1 fixedly mounted to the two springs 2 is vertically shifted (focusing operation) sc that the focusing spot of the light beam 12 is accurately formed or imaged on the optical disk 13.

The vertical shift of the objective lens 1, however, causes dust 16 to be attracted and guided through the light-beam passage aperture 10 into the interior of the objective-lens driving mechanism. In addition, even when the objective lens 1 is not moved, the dust 16 present in the ambient air outside the object-lens driving mechanism tends to fall on the light-beam passage aperture 10 and enter into the interior of the object-lens driving mechanism.

The dust 16, having thus invaded the interior of the object-lens driving mechanism, tends to be passed through the gap around the objective lens 1 and to gradually reach the inner wall of the base 7. In the present embodiment, however, since the dust blocking pipe 8 is provided for isolating the light-beam passage aperture 9 communicating with the optical pickup from the gap in the interior of the object-lens driving mechanism into which the dust 16 has invaded through the light-beam passage aperture 10, it can be avoided that the dust 16 reaches the interior of the pickup, which has many optical parts therein including the tracking mirror 14, so that it instead and accumulates in the vicinity of the outer periphery of the dust blocking pipe 8, whereby the characteristics of the pickup and object-lens driving mechanism are not adversely affected.

Figure 5:
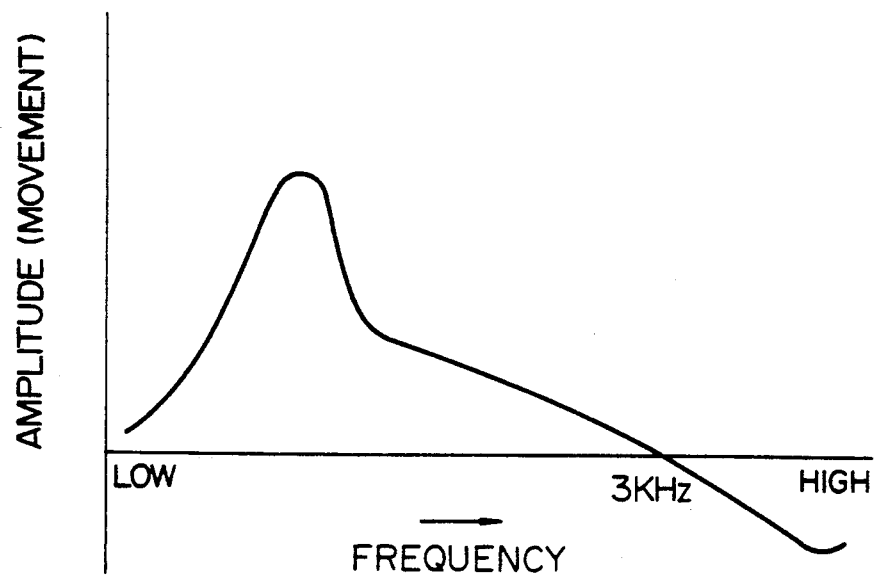
FIG. 5 is an amplitude-frequency characteristic diagram between the object lens and driving mechanism.

FIG. 5 shows an amplitude-frequency characteristic diagram between the objective lens 1 and the driving mechanism. Assume as an example that the optical disk 13 has a rotational frequency of 40 Hz (2400 rpm) and the objective lens 1 has a shift stroke of about 0.3 mm. Then the dust blocking pipe 8 is made of a soft rubber material having a thickness of several ten $\mu$m. In this case, a resonance point takes place at a frequency of about 60–80 Hz but the driving mechanism is operated in a frequency range of about 3 KHz. Even when the dust blocking pipe 8 of the present invention is attached to the objective lens 1, this will cause no substantial variation in the characteristic of FIG. 5 and thus the resonance point will not be shifted into the frequency range of the driving mechanism.

As has been explained in the foregoing, in accordance with the present embodiment, the interior of the pickup incorporating many optical parts is separatingly isolated by means of the dust blocking pipe 8 from the dust invasion space within the object-lens driving mechanism possibly leading to the external space. As a result, even in the case where the optical pickup device of the invention is exposed or operated in a space carrying very small sized dust particles, it can be avoided that dust particles in the outside space invade the interior of the pickup having many optical parts incorporated therein. Thus, a defect in the prior art, wherein dust or foreign matter is attached onto optical parts provided within the interior of the pickup to disable the normal recording/reproducing of data to the optical disk, can be eliminated. Accordingly, the optical pickup device of the present invention can advantageously record and reproduce data to and from the optical disk, requiring only the periodic cleaning of the top (exposed surface) of the objective lens 1.

Further, it is possible to design the rigidity of the springs 2 and dust blocking pipe 8 such that a main resonance frequency in the frequency characteristic of the object-lens driving mechanism has a suitable value, and this does not adversely affect the high-order resonance frequency at all, unlike in the prior art. Therefore, the present invention has a merit that the invention can have a perfect dust blocking function while not adversely affecting the frequency characteristic of the object-lens driving mechanism as its most important performance. The dust blocking pipe 8 is desirably made of such material as to minimize the adverse effect of the provision of the pipe 8 on the resonance of the lens system; that is, in addition to the aforementioned soft rubber material, cloth, vinyl or other proper resin may be used.

Figure 6B:
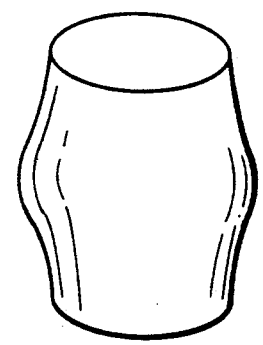
Figure 7:
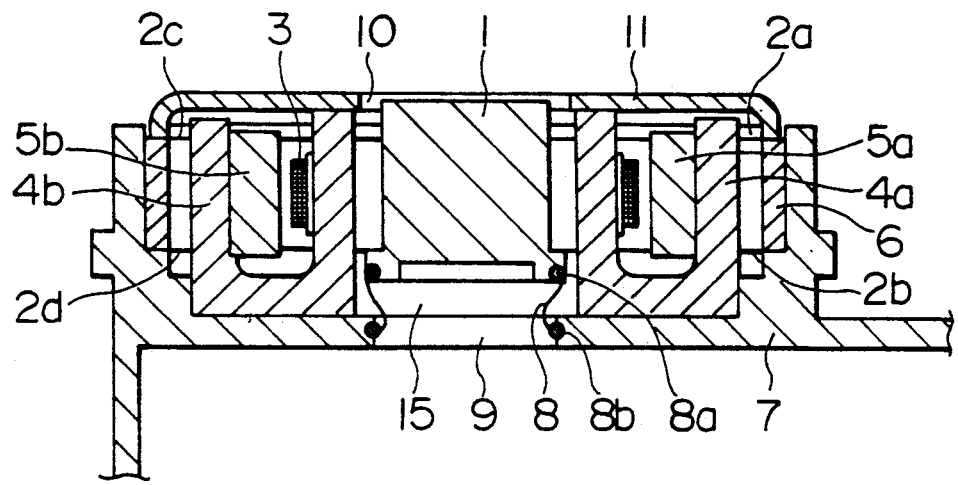
FIG. 7 is a cross-sectional view of a second embodiment of the optical pickup device of the present invention.

Shown by a perspective view in FIG. 6B is another example of the dust blocking pipe having a shape different from that of FIG. 6A. FIG. 7 is a cross-sectional view of another embodiment of the optical pickup device of the present invention, wherein the dust blocking pipe of FIG. 6B is employed and the same parts as those in FIG. 2 are denoted by the same reference numerals or symbols and explanation thereof is omitted. In the embodiment of FIG. 7, that part of the dust blocking pipe of FIG. 6B which corresponds to the bellows part of the dust blocking pipe of FIG. 6A has such a vertical length that the pipe of FIG. 6B can be expanded or compressed vertically with a sufficient allowance throughout the entire shift range of the objective lens 1, or the dust blocking pipe of FIG. 6B is made of such material as to be sufficiently expandable or compressible in the shift range of the objective lens 1. The dust blocking pipe 8 of FIG. 6B is provided at its both ends with reinforcing parts 8a and 8b. The pipe of FIG. 6B can be manufactured more easily than the pipe of FIG. 6A.

Figure 8:
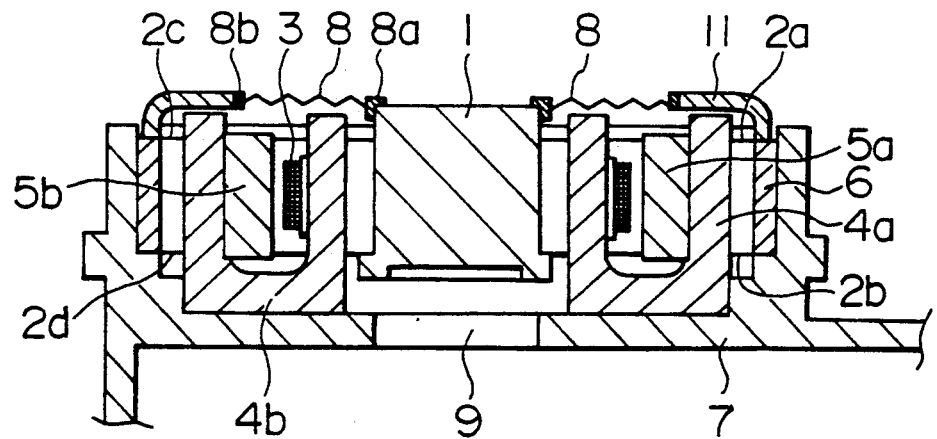
FIG. 8 is a cross-sectional view of a third embodiment of the optical pickup device of the present invention.

Referring to FIG. 8, there is shown, in cross section, a further embodiment of the present invention in which a dust blocking member is located at a place different from that in the foregoing embodiments. In the drawing, the same parts as those in FIG. 2 are denoted by the same reference numerals or symbols and explanation thereof is omitted.

The dust blocking member 8 has a plate shape rather than a pipe shape and is made of a soft material having a wave cross section. The member 8 is formed in its center with an opening which faces the objective lens 1. The dust blocking member 8 tightly fixedly receives at its inner peripheral edge (periphery of the central opening) the upper outer periphery or inner periphery (not shown) of the objective lens 1 without any gap therebetween directly or indirectly through a fitting member (fitted around the inner periphery edge of the member 8) or such a proper member 8a as a reinforcing member. Simultaneously, the dust blocking member 8 is tightly fixedly fitted at its outer periphery edge to a cover member 11 or an upper spring member 2a-2c disposed on the object-lens driving mechanism or to a stationary member (yoke 4) of the driving mechanism directly or indirectly through such an appropriate member 8b as a fitting member or a reinforcing member.

According to the present embodiment, since the dust blocking member 8 closingly blocks the upper light-beam passage aperture 10, dust particles can be prevented from invading not only into the interior of the pickup containing the tracking mirror 14 and so on therein but also into the interior of the object-lens driving mechanism.

Although explanation has been made in connection with the case where only the driving coil (focusing coil) and magnetic circuits are provided to shift the objective lens in its optical axis direction in the foregoing embodiments, at least one coil for driving the objective lens in directions perpendicular to the optical axis of the object lens and associated magnetic circuits, in addition to the driving coil and magnetic circuits, may be provided and the dust blocking member 8 may be mounted in the same manner as in the above.

As has been detailed in the foregoing, in accordance with the present invention, a communication path (light-beam passage aperture) between the object-lens driving mechanism and pickup can be completely isolated from an ambient space carrying dust by means of such a dust blocking member as a dust blocking pipe. As a result, the optical pickup device of the invention can advantageously realize its complete dust blocking function of avoiding any intrusion of dust into the interior of the pickup, which has many optical parts incorporated therein, even when the device is placed in a space containing various sorts and sizes of dust particles.

Further, since the formation of the dust blocking member in the form of a very-soft-material pipe expandable and compressable in its vertical and horizontal directions prevents any adverse effect resulting from the provision of such a dust blocking member on the frequency characteristic (in particular, high-order resonance frequency) of the object-lens driving mechanism, the optical pickup device of the invention can advantageously realize its dust blocking function without causing any substantial variation in the inherent frequency characteristic of the object-lens driving mechanism.

Although the mechanism for driving the objective lens 1 has been arranged to move the lens only in its optical axis direction (vertical direction) in the foregoing embodiments, the present invention may be arranged so that the driving mechanism can move the objective lens 1 both in the vertical direction and in the direction (horizontal direction) perpendicular to the optical axis of the optical lens. In the latter case, driving magnets and a driving coil for horizontally driving the objective lens are added to the driving mechanism of FIG. 4, for example.

What is claimed is:

1. An optical pickup device for outputting a light beam and inputting a subsequently reflected light beam thereof, comprising:
   a casing having a first opening therein;
   first and second internal chambers enclosed by said casing so that said first opening communicates with said second internal chamber;
   an optical system disposed in said first internal chamber and having photoelectric elements for receiving and emitting a light beam;
   an objective lens disposed in said second internal chamber and spaced from an edge of the first opening, said objective lens being optically coupled with said optical system;
   driving means for moving said objective lens to a desired position; and
   a resilient member operably disposed between said objective lens and said casing for sealing said first internal chamber from a space external to said first internal chamber.

2. An optical pickup device according to claim 1, wherein said casing further has a second opening between said first and second internal chambers, and wherein said resilient member is mounted to both the edge of said objective lens which is opposed to an output side of said light beam and to the casing at the edge of said second opening.

3. An optical pickup device according to claim 2, wherein said resilient member is a flexible, substantially cylindrical member arranged so as substantially not to impede said driving means and a movement-frequency characteristic of said objective lens.

4. An optical device according to claim 3, wherein said resilient member is provided with a corrugation.

5. An optical pickup device according to claim 1, wherein said resilient member is mounted to the edge of said objective lens located at the output side of said light beam and to the casing at the edge of said first opening.

6. An optical pickup device according to claim 5, wherein said resilient member is a flexible, substantially planar firm arranged so as substantially not to impede said driving means and a movement-frequency characteristic of said objective lens.

7. An optical pickup device according to claim 1, wherein said driving means includes first objective lens driving means for driving said objective lens in its optical axis direction.

8. An optical pickup device according to claim 7, wherein said first objective lens driving means includes permanent magnets fixedly mounted to said casing for generating a magnetic field and a current coil fixedly mounted to said objective lens as disposed in said magnetic field, and wherein the objective lens is arranged to move in said optical axis direction according to a current flowing through said current coil of said first objective lens driving means.

9. An optical pickup device according to claim 7, wherein said driving means further includes second objective lens driving means for moving said objective lens in a direction perpendicular to its optical axis.

10. An optical pickup device according to claim 9, wherein said second objective lens driving means includes permanent magnets fixedly mounted to said casing for generating a magnetic field and a current coil fixedly mounted to said objective lens as disposed in said magnetic field, and wherein the objective lens is arranged to move in said direction perpendicular to the optical axis of the objective lens according to a current flowing through said current coil of said second objective lens driving means.

11. An optical pickup device according to claim 2, wherein said driving means includes first objective lens driving means for driving said objective lens in its optical axis direction.

12. An optical pickup device according to claim 3, wherein said driving means includes first objective lens driving means for driving said objective lens in its optical axis direction.

13. An optical pickup device according to claim 4, wherein said driving means includes first objective lens driving means for driving said objective lens in its optical axis direction.

14. An optical pickup device according to claim 5, wherein said driving means includes first objective lens driving means for driving said objective lens in its optical axis direction.

15. An optical pickup device according to claim 6, wherein said driving means includes first objective lens driving means for driving said objective lens in its optical axis direction.

16. An optical pickup device according to claim 11, wherein said first objective lens driving means includes permanent magnets fixedly mounted to said casing for generating a magnetic field and a current coil fixedly mounted to said objective lens as disposed in said magnetic field, and wherein the objective lens is arranged to move in said optical axis direction according to a current flowing through said current coil of said first objective lens driving means.

17. An optical pickup device according to claim 12, wherein said first objective lens driving means includes permanent magnets fixedly mounted to said casing for generating a magnetic field and a current coil fixedly mounted to said objective lens as disposed in said magnetic field, and wherein the objective lens is arranged to move in said optical axis direction according to a current flowing through said current coil of said first objective lens driving means.

18. An optical pickup device according to claim 13, wherein said first objective lens driving means includes permanent magnets fixedly mounted to said casing for generating a magnetic field and a current coil fixedly mounted to said objective lens as disposed in said magnetic field, and wherein the objective lens is arranged to move in said optical axis direction according to a current flowing through said current coil of said first objective lens driving means.

19. An optical pickup device according to claim 14, wherein said first objective lens driving means includes permanent magnets fixedly mounted to said casing for generating a magnetic field and a current coil fixedly mounted to said objective lens as disposed in said magnetic field, and wherein the objective lens is arranged to move in said optical axis direction according to a current flowing through said current coil of said first objective lens driving means.

20. An optical pickup device according to claim 15, wherein said first objective lens driving means includes permanent magnets fixedly mounted to said casing for generating a magnetic field and a current coil fixedly mounted to said objective lens as disposed in said magnetic field, and wherein the objective lens is arranged to move in said optical axis direction according to a current flowing through said current coil of said first objective lens driving means.

21. An optical pickup device according to claim 11, wherein said driving means further includes second objective lens driving means for moving said objective lens in a direction perpendicular to its optical axis.

22. An optical pickup device according to claim 12, wherein said driving means further includes second objective lens driving means for moving said objective lens in a direction perpendicular to its optical axis.

23. An optical pickup device according to claim 13, wherein said driving means further includes second objective lens driving means for moving said objective lens in a direction perpendicular to its optical axis.

24. An optical pickup device according to claim 14, wherein said driving means further includes second objective lens driving means for moving said objective lens in a direction perpendicular to its optical axis.

25. An optical pickup device according to claim 15, wherein said driving means further includes second objective lens driving means for moving said objective lens in a direction perpendicular to its optical axis.

26. An optical pickup device according to claim 21, wherein said second objective lens driving means includes permanent magnets fixedly mounted to said casing for generating a magnetic field and a current coil fixedly mounted to said objective lens as disposed in said magnetic field, and wherein the objective lens is arranged to move in said direction perpendicular to the optical axis of the objective lens according to a current flowing through said current coil of said second objective lens driving means.

27. An optical pickup device according to claim 22, wherein said second objective lens driving means includes permanent magnets fixedly mounted to said casing for generating a magnetic field and a current coil fixedly mounted to said objective lens as disposed in said magnetic field, and wherein the objective lens is arranged to move in said direction perpendicular to the optical axis of the objective lens according to a current flowing through said current coil of said second objective lens driving means.

28. An optical pickup device according to claim 23, wherein said second objective lens driving means includes permanent magnets fixedly mounted to said casing for generating a magnetic field and a current coil fixedly mounted to said objective lens as disposed in said magnetic field, and wherein the objective lens is arranged to move in said direction perpendicular to the optical axis of the objective lens according to a current flowing through said current coil of said second objective lens driving means.

29. An optical pickup device according to claim 24, wherein said second objective lens driving means includes permanent magnets fixedly mounted to said casing for generating a magnetic field and a current coil fixedly mounted to said objective lens as disposed in said magnetic field, and wherein the objective lens is arranged to move in said direction perpendicular to the optical axis of the objective lens according to a current flowing through said current coil of said second objective lens driving means.

30. An optical pickup device according to claim 25, wherein said second objective lens driving means includes permanent magnets fixedly mounted to said casing for generating a magnetic field and a current coil fixedly mounted to said objective lens as disposed in said magnetic field, and wherein the objective lens is arranged to move in said direction perpendicular to the optical axis of the objective lens according to a current flowing through said current coil of said second objective lens driving means.

31. An optical pickup device according to claim 1, further comprising a reinforcing means for reinforcing the mounting arrangement of said resilient member.

* * * * *